(12) United States Patent
Kong et al.

(10) Patent No.: US 7,242,466 B2
(45) Date of Patent: Jul. 10, 2007

(54) REMOTE POINTING SYSTEM, DEVICE, AND METHODS FOR IDENTIFYING ABSOLUTE POSITION AND RELATIVE MOVEMENT ON AN ENCODED SURFACE BY REMOTE OPTICAL METHOD

(75) Inventors: Yuan Kong, Kirkland, WA (US); Glen Larsen, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 392 days.

(21) Appl. No.: 10/814,517

(22) Filed: Mar. 31, 2004

(65) Prior Publication Data

US 2005/0225749 A1    Oct. 13, 2005

(51) Int. Cl.
*G01J 1/42* (2006.01)
(52) U.S. Cl. .................................................. 356/218
(58) Field of Classification Search ........ 356/616–619; 345/156
See application file for complete search history.

(56) References Cited

U.S. PATENT DOCUMENTS

| | | | |
|---|---|---|---|
| 4,364,035 A | 12/1982 | Kirsch | |
| 4,499,374 A * | 2/1985 | Kabaya | 250/237 G |
| 4,719,455 A | 1/1988 | Louis | |
| 4,794,384 A | 12/1988 | Jackson | |
| 5,107,541 A | 4/1992 | Hilton | |
| 5,155,355 A * | 10/1992 | Kabaya | 250/237 G |
| 5,274,361 A | 12/1993 | Snow | |
| 5,442,147 A | 8/1995 | Burns et al. | |
| 5,574,480 A | 11/1996 | Pranger et al. | |
| 5,604,345 A * | 2/1997 | Matsuura | 250/237 G |
| 5,644,139 A | 7/1997 | Allen et al. | |
| 5,712,658 A | 1/1998 | Arita et al. | |
| 5,729,009 A | 3/1998 | Dändliker et al. | |
| 5,793,357 A | 8/1998 | Ivey et al. | |
| 5,852,434 A | 12/1998 | Sekendur | |
| 5,907,152 A | 5/1999 | Dändliker et al. | |

(Continued)

FOREIGN PATENT DOCUMENTS

EP    0295720 A2    12/1988

(Continued)

OTHER PUBLICATIONS

Asakura et al., "Dynamic Laser Speckles and Their Application to Velocity Measurements of the Diffuse Object," Applied Physics, 1981, 179-194.

(Continued)

*Primary Examiner*—Tarifur Chowdhury
*Assistant Examiner*—Isiaka O. Akanbi
(74) *Attorney, Agent, or Firm*—Senniger Powers

(57) ABSTRACT

A pointing system comprises an encoded surface and a pointing device for use with an encoded surface remote from the pointing device. The pointing device comprises a collimated light source for projecting a collimated light beam having a wavelength outside the visible light spectrum onto the encoded surface. The encoded surface scatters the collimated light beam striking the encoded surface. A detector associated with the collimated light source detects at least a portion of the scattered light. A controller is associated with the detector and configured to respond to the detected portion of the scattered light to determine a position where the collimated light beam strikes the encoded surface. The position corresponds to where the device is pointing.

37 Claims, 3 Drawing Sheets

U.S. PATENT DOCUMENTS

| | | |
|---|---|---|
| 5,914,783 A | 6/1999 | Barrus |
| 6,031,218 A | 2/2000 | Piot et al. |
| 6,057,540 A | 5/2000 | Gordon et al. |
| 6,124,587 A | 9/2000 | Bidiville et al. |
| 6,246,482 B1 | 6/2001 | Kinrot et al. |
| 6,256,016 B1 | 7/2001 | Piot et al. |
| 6,281,882 B1 | 8/2001 | Gordon et al. |
| 6,310,988 B1 | 10/2001 | Flores et al. |
| 6,323,839 B1 | 11/2001 | Fukuda et al. |
| 6,330,057 B1 | 12/2001 | Lederer et al. |
| 6,331,848 B1 | 12/2001 | Stove et al. |
| 6,424,407 B1 | 7/2002 | Kinrot et al. |
| 6,448,977 B1 | 9/2002 | Braun et al. |
| 6,452,683 B1 | 9/2002 | Kinrot et al. |
| 6,454,482 B1 | 9/2002 | Silverbrook et al. |
| 6,455,840 B1 | 9/2002 | Oliver et al. |
| 6,474,888 B1 | 11/2002 | Lapstun et al. |
| 6,498,604 B1 | 12/2002 | Jensen |
| 6,515,651 B1 | 2/2003 | Berstis |
| 6,570,104 B1 | 5/2003 | Ericson et al. |
| 6,621,068 B2 * | 9/2003 | Aoki et al. ............ 250/231.14 |
| 6,667,695 B2 | 12/2003 | Pettersson et al. |
| 6,674,427 B1 | 1/2004 | Pettersson et al. |
| 6,689,966 B2 | 2/2004 | Wiebe |
| 6,707,027 B2 | 3/2004 | Liess et al. |
| 6,759,647 B2 * | 7/2004 | Ito et al. ................. 250/231.1 |
| 6,918,538 B2 | 7/2005 | Breytman et al. |
| 2003/0103037 A1 | 6/2003 | Rotzoll |
| 2004/0061680 A1 | 4/2004 | Taboada |
| 2005/0035947 A1 | 2/2005 | Lutian |

FOREIGN PATENT DOCUMENTS

| | | |
|---|---|---|
| GB | 2272763 A | 5/1994 |
| WO | WO 97/43607 A1 | 11/1997 |

OTHER PUBLICATIONS

Meyer, "Pen Computing: A Technology Overview and A Vision," ACM SIGCHI Bulletin, Jul. 1995, pp. 46-90, vol. 27, Issue 3, ACM Press, New York, USA.

Ohtsubo et al., "Velocity Measurement of a Diffuse Object by Using Time-Varying Speckles," Optical and Quantum Electronics, 1976, pp. 523-529, Chapman and Hall Ltd., Great Britain.

Optical Mouse Saves Space, The Online Photonics Resource, http://optics.org, Dec. 8, 2003, 2 pp., United States.

Optical Scrolling, The Online Photonics Resource, http://optics.org, Dec. 8, 2003, 1 pg., United States.

Prototype Device, The Online Photonics Resource, http://optics.org, Dec. 8, 2003, 1 pg., United States.

Schnell et al., "Detection of Movement with Laser Speckle Patterns: Statistical Properties," Optical Society of America, Jan. 1998, pp. 207-216, vol. 15, No. 1.

* cited by examiner

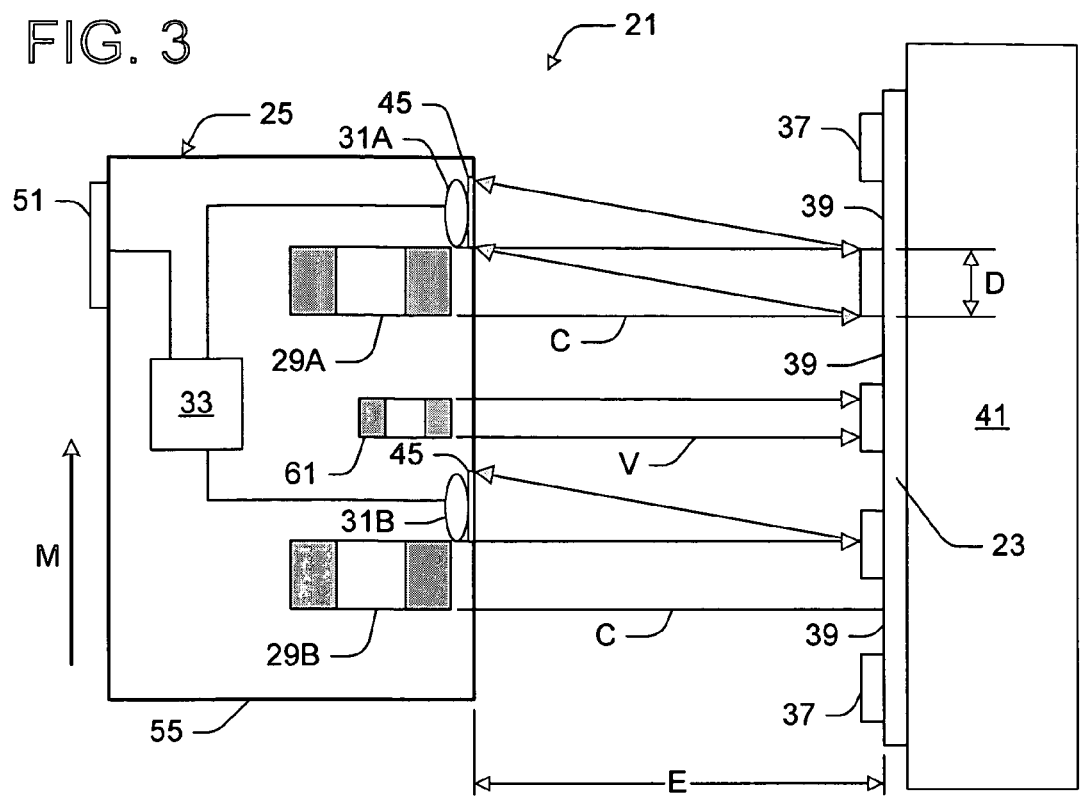
FIG. 3
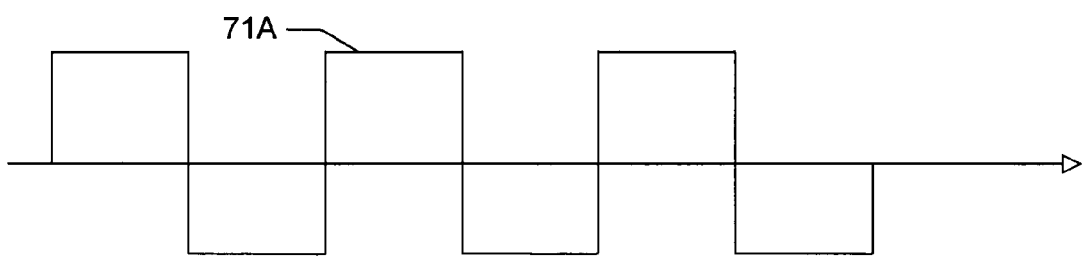
FIG. 4
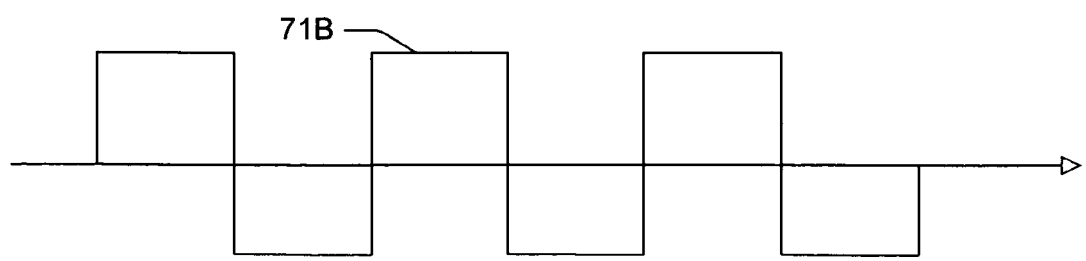

REMOTE POINTING SYSTEM, DEVICE, AND METHODS FOR IDENTIFYING ABSOLUTE POSITION AND RELATIVE MOVEMENT ON AN ENCODED SURFACE BY REMOTE OPTICAL METHOD

TECHNICAL FIELD

Embodiments of the present invention relate to the field of computer input devices, and particularly pointing devices, employing light striking an encoded surface for identifying absolute position on the encoded surface and/or relative movement on the encoded surface for providing computer input.

BACKGROUND OF THE INVENTION

Utilizing a visible-light laser pointer to designate a position on a display is a known means for providing input to a control device such as a computer. For example, a display, such as an image projected on a screen, may include particular command areas, viewable by the user, and corresponding to particular commands. A camera is directed toward the display to provide image information to a computer, or controller. Thus, when a user directs a visible-light laser beam toward the display, specifically toward a particular command area, the controller can compare the projected image and the detected image to determine the difference between the two images, which corresponds to the location on the display where the laser beam strikes the display. If the laser beam is striking one of the command areas, the controller can execute a command associated with the command area. An example of such a command is to change the image on the display. Such devices are limited to referencing laser beam position on projected images only. The projected image must be stored within the controller for comparison with the laser-modified image. Such devices are not capable of determining a position of a laser spot on a surface wherein the unaltered image of the surface is not stored within the controller.

Another known input device determines the location of an infrared laser beam striking a display by utilizing an infrared camera in fixed relative position to the display. The infrared camera sends an infrared video signal to an image processing unit to digitize the video signal to determine the location of the infrared laser spot on the display. In addition, the device has the capability of sensing the location of multiple lasers pointed at the display simultaneously. Each laser may have a particular shape (e.g., three spots, a plus sign), also detectable by the infrared camera, such that a particular cursor associated with each particular pointer may be imaged upon the display in a position corresponding to the location of the particular laser pointer. Such devices are limited to circumstances wherein an infrared camera may be placed in fixed relation to the display for the determination of the absolute position of the laser spot on the display.

Yet another known device eliminates the camera of the above-noted examples and utilizes a detector located on the axis of an image projector. The device collects light from each on-screen pixel via a single detector during a scanning procedure, whereby the value of each pixel is collected individually, utilizing a pivoting mirror. During scanning, the detector can determine the presence and location of a spot illuminated by the laser pointer. Like the previous devices, such a device is useful for determining the location of an illuminated spot within a projected image, but is not useful in determining the location of an illuminated spot on any surface.

Another known input device utilizes a pen-shaped device for use with a patterned writing surface for detecting the location of the device with respect to the patterned surface. The patterned surface includes features that reflect light, such as infrared light, whereas the remaining areas of the patterned surface do not reflect such light. For example, the stylus includes an infrared light-emitting diode for projecting infrared light onto the patterned surface and a sensor sensitive to infrared light for detecting infrared light reflected by the features of patterned surface. Thus, when the device projects infrared light over a particular area of the patterned surface, the sensor detects a reflected sub-pattern of the patterned surface, which corresponds to the position of the device with respect to the patterned surface. By processing this sub-pattern, the location of the device with respect to the patterned surface may be determined. By determining this location, the location and movement of the device over the surface may be determined. Such a device is useful for handwriting recognition, for example, because the device must abut against, or be held a short distance from, the patterned surface in order to determine the position of the device. But such a device is not generally useful for pointing to a location on a patterned surface remote from the device some distance.

SUMMARY OF THE INVENTION

Accordingly, an improved pointing system is desired to address one or more of these and other disadvantages. Aspects of such a pointing system involve an encoded surface and a device having a collimated light source, a detector, and a controller, for pointing the device and a light beam having a wavelength outside the visible light spectrum toward the encoded surface for identifying a position on the encoded surface and determining the position where the collimated light beam strikes the encoded surface corresponding to where the device is pointing. In particular, embodiments of this invention relate to pointing systems, pointing devices, and methods capable of projecting a collimated light beam onto the encoded surface to scatter the collimated light beam, detecting at least a portion of the scattered light, and responding to the detected portion of the scattered light to determine the absolute position where the collimated light beam strikes the encoded surface and/or any relative movement of the position where the collimated light beam strikes the encoded surface, which corresponds to where the device is pointing or any relative movement of where the device is pointing, respectively. Moreover, the features of the present invention described herein are less laborious and easier to implement than currently available techniques as well as being economically feasible and commercially practical.

In accordance with one aspect of the invention, a pointing system has an encoded surface and a pointing device for use with the encoded surface, wherein the device is remote from the encoded surface during pointing. The pointing device includes a collimated light source for projecting a collimated light beam onto the encoded surface. The encoded surface scatters the collimated light beam striking the encoded surface. A detector associated with the collimated light source detects at least a portion of the scattered light. A controller is associated with the detector and configured to respond to the detected portion of the scattered light to determine a position where the collimated light beam strikes the encoded surface. The position corresponds to where the device is pointing.

In another aspect of the invention, a pointing device for use with an encoded surface remote from the pointing device has a collimated light source, a detector, and a controller generally as set forth above. The device further comprises a housing, wherein the collimated light source and the detector mount on the housing.

In yet another aspect of the invention, a method determines a position where a collimated light beam of a pointing device strikes an encoded surface remote from the pointing device, the location corresponding to where the device is pointing. The method includes projecting the collimated light beam from the pointing device onto the encoded surface. The encoded surface has light-scattering properties for scattering the collimated light beam. The method further includes detecting at least a portion of the light scattered by the encoded surface and determining the position where the collimated light beam strikes the encoded surface, which corresponds to where the device is pointing, as a function of a characteristic of the detected scattered light.

Alternatively, the invention may comprise various other methods and apparatuses.

Other features will be in part apparent and in part pointed out hereinafter.

BRIEF DESCRIPTION OF THE DRAWINGS

FIG. 3 is a schematic of the device of FIG. 1 interacting with an encoded surface;

FIG. 4 depicts two additional phase-separated waveforms detected as a collimated light beam moves in the opposite direction of FIG. 2.

DETAILED DESCRIPTION OF THE INVENTION

Figure 1:
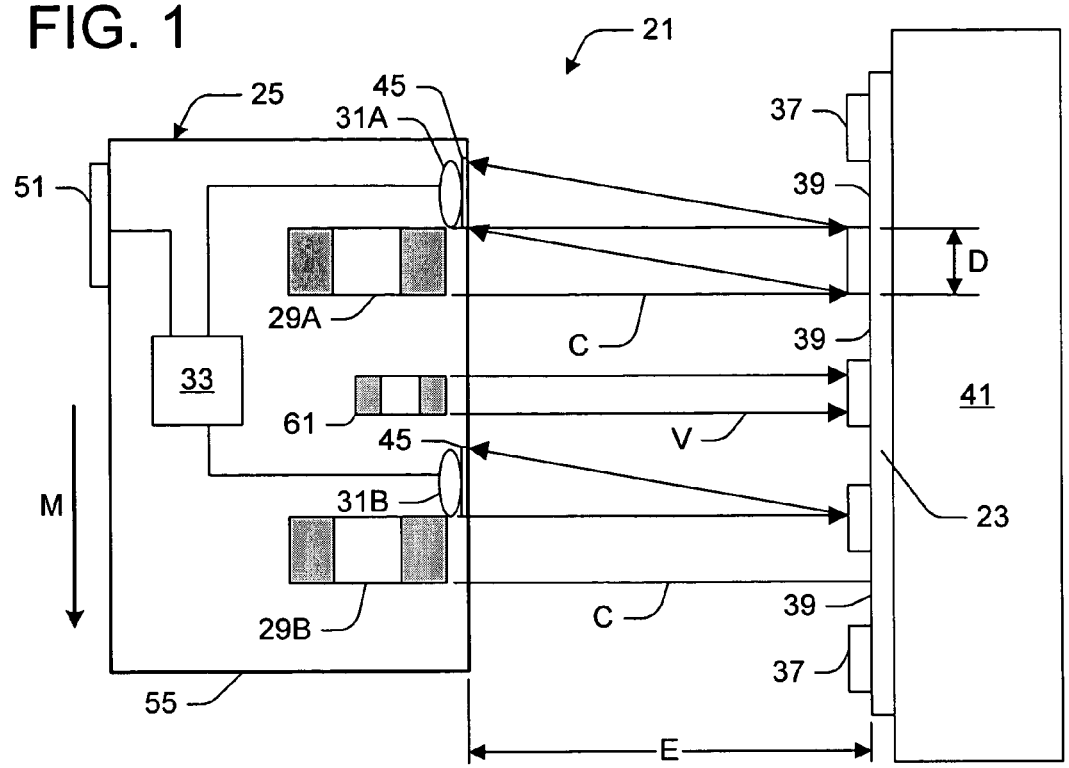
FIG. 1 is a schematic of a device of the present invention interacting with an encoded surface.

Referring first to FIGS. 1 and 3, a pointing system, generally indicated 21, is depicted. The pointing system 21 comprises, among other things, an encoded surface 23 and a pointing device, generally indicated 25, for use with the encoded surface. In general, the pointing device 25 comprises a collimated light source 29, a detector 31, and a controller 33 associated with the detector. In one embodiment, the pointing device 25 comprises one collimated light source 29, one detector 31, and one controller 33 associated with the detector. The pointing device 25 may comprise additional collimated light sources and detectors, such as the two collimated light sources 29A,29B and detectors 31A, 31B, depicted in FIGS. 1 and 3, as will be explained in greater detail below. Any reference herein to a device comprising collimated light sources 29 or detectors 31 is equally applicable to a device having a fewer or greater number of collimated light sources or detectors.

Each collimated light source 29A,29B projects a collimated light beam C onto the encoded surface 23. The collimated light beams C are not visible to the human eye. In one example, the collimated light beams C comprise infrared light, and other types of non-visible radiation are also contemplated as within the scope of the invention (e.g., microwaves, etc.). Other types of collimated light sources 29A,29B and lasers are also contemplated as within the scope of the claimed invention. Exemplary light sources will draw as little current as possible. This ensures that the light source may be used in a cordless device application without unduly limiting the battery life of the device. The collimated light source 29 may be of any suitable type, such as a resonant cavity light-emitting diode (RC-LED), a Vertical Cavity Surface-Emitting Laser (VCSEL), and an Edge Emitting Laser-Diode (EELD). Other lasers and sources of collimated light may also be utilized without departing from the scope of the claimed invention.

As will be discussed in detail below, the encoded surface 23 is configured to scatter the collimated light beam C striking the encoded surface, thereby diffusing the light in many directions. Where the collimated light source 29 emits only infrared radiation, the encoded surface 23 is configured to scatter only infrared light. Other wavelengths of light will simply pass though or be absorbed by the encoded surface 23.

The encoded surface comprises at least one scattering feature 37 that substantially scatters infrared light in a manner to maximize the signals detected, as discussed in detail below. The encoded surface 23 also comprises at least one non-scattering feature 39 that does not substantially scatter infrared light. In most examples discussed herein, many scattering features 37 and non-scattering features 39 are included within the encoded surface 23. In particular, the many scattering features 37 and non-scattering features 39 cooperate to create a pattern on the encoded surface 23. In particular, the encoded surface 23 is encoded with a digital pattern, and the controller 33 is configured to determine position as a function of the digital pattern. The infrared scattering features 37 of the encoded surface 23 are transparent to visible light. The encoded pattern is not necessarily continuous, but may comprise many scattering features 37 that together form a two-dimensional bit pattern. The bit pattern may be coded by an appropriate algorithm, such that any subset area of a defined size contains a number of bits whose arrangement can be decoded to indicate the position of the subset area. The collimated light source 29 of the device 25 illuminates the encoded surface 23 with a collimated, infrared light beam C, and a detector 31 detects the bit pattern as the individual scattering features 37 scatter the infrared light. The pattern on the encoded surface 23 is not detectable to the human eye, and allows complete transmission of light at visible wavelengths. Such a pattern may serve to provide one or both of the following functions, namely, providing absolute position information or relative displacement information, as will be discussed in greater detail below. In one example, the scattering features 37 are infrared coatings, as discussed in detail below and in Appendix A.

With the collimated light scattering in many directions from the encoded surface 23, the orientation of the collimated light beam C with respect to the encoded surface is relatively unimportant (with respect to detecting the light scattered from the encoded surface). For example, the collimated light beam C may be oriented at several acceptable angles relative to the encoded surface 23 because the surface scatters the light in many directions, including toward the detector 31. As used herein, scattering may also be considered reflecting the collimated light in many directions.

In one example, the encoded surface 23 is visible-light transparent, such that visible light striking the encoded surface will pass through freely. This type of encoded surface 23 is essentially transparent to the user because it does not reflect visible light, thereby making the encoded surface particularly appropriate for adding to virtually any surface. For example, the encoded surface may be incorporated into a display 41 (e.g., a cathode ray tube (CRT), a liquid crystal display (LCD), an organic light-emitting diode (OLED) display, a projected image, or a plasma display panel (PDP), etc.), a screen, a whiteboard, a wall, an appliance, or any other surface, thereby encoding the surface for interaction with the device 25 and likely a networked computer. For example, a networked microwave oven may include an encoded surface 23 over a series of activation areas, or buttons, of the microwave. Thus, the microwave may be used customarily without use of the encoded surface 23. In addition, however, by pointing the collimated light beam C of the device 25 at an activation area, the detector 31 can detect the scattered light, indicating that the particular activation area of interest should be activated, and send a command corresponding to the activation area on the Microwave via a personal computer. The encoded surface 23 may either be incorporated into the product during manufacture, or applied to the product after manufacture to enhance functionality of the product. An explanation of techniques for creating such an encoded surface 23 are set forth in detail below in Appendix A, although other techniques are also contemplated as within the scope of the claimed invention.

Because the encoded surface 23 may be applied to virtually any surface, the size of the encoded surface is not limited. In particular, in one example the encoded surface includes an area of at least 0.13 square meters (200 square inches). Moreover, the encoded surface 23 may be as large as a large television, a projection screen, or even a large wall. The size of the encoded surface 23 is unimportant, as long as the collimated light beam C can reach the encoded surface and the scattered light can reach the detector 31.

The detector 31 is associated with the collimated light source 29 for detecting at least a portion of the scattered light. Suitable detectors 31 may include photodetectors, CCDs (charge-coupled devices), CMOS (complementary metal-oxide semiconductor) sensors, or other detector arrays, such as those integral with the collimated light source 29. In one example, the detector 31 is a photodetector comprising at least four elements for detecting at least a portion of the scattered light. The detector 31 may comprise additional elements if additional light detection is required by the controller to determine position, such as when absolute positioning is desired.

The device 25 may further comprise a filter 45 for substantially filtering out light of a wavelength irrelevant to the detected portion of scattered light. In the case where the detected scattered light is infrared, the filter 45 may be an infrared light passing/visible light blocking filter for substantially filtering out visible light, ensuring the detector only sees the intended scattered infrared light.

The controller 33 is associated with the detector 31 and is configured to respond to the detected portion of the scattered light to determine a position where the collimated light beam C strikes the encoded surface 23, the position corresponding to where the device is pointing. Those skilled in the art would recognize that the controller 33 may be either a processor or an application-specific integrated circuit (ASIC), among other things. The controller 33 may further comprise imaging processing firmware or circuitry to process the detected scattered light, as would be understood by one skilled in the art.

In one embodiment, when the encoded surface 23 is mounted on or incorporated with a display 41, the controller 33 signals the display to display an image corresponding to the absolute position where the collimated light beam strikes the encoded surface. Thus, when the pointing device 25 points toward a particular area upon the encoded surface 23 of the display 41, an image, such as a cursor, appears on the display corresponding to the position where the pointing device is pointing. To enhance the precision with which the pointing device 25 can refer to a particular position on the encoded surface 23, the device may further comprise a position adjustment mechanism 51 selectable by the user for manually adjusting the location of the image on the display 41. The position adjustment mechanism 51 may be of any type known in the art, such as a trackball or a touchpad.

The device 25 further comprises a housing 55 associated with the collimated light source 29, the detector 31, and the controller 33 for containing and protecting the components of the device. The housing 55 may take any form, without departing from the scope of the claimed invention. For example, the housing 55 may be in the shape of a remote control, an optical pointer, or any other pointing device.

In addition to the collimated light sources 29A,29B discussed above, the pointing device may further comprise a visible light source 61 for projecting a visible light beam V, such as a laser beam, toward the encoded surface 23 in substantially the same position where the collimated light beam C strikes the encoded surface. Because the collimated light beam C is not within the visible spectrum, a user may have difficulty determining exactly where the device 25 is pointed. This is particularly true where the encoded surface 23 is incorporated with a surface not capable of imaging a cursor, such as a large screen or wall with an encoded surface. In these situations, having visible light beam V aids the user in aiming the pointing device 25 to the desired location.

Although not shown, the pointing device 25 may additionally comprise an optic, or optics, arranged between the collimated light source 29 and the encoded surface 23 for directing the collimated light beam C. Such optics may be converging or diverging optics, and the optics may also be integral with the collimated light source 29.

The components of the device 25 may further be mounted on a common substrate (not shown). Specifically, the collimated light source 29, the detector 31, and the controller 33 may mount adjacent each other on the same substrate, providing the added benefit during manufacturing of allowing these components to be added to the device 25 as a single assembly. Moreover, the single substrate aids in packaging the device 25 because it is compact and lowers cost, as only a single substrate is necessary. More importantly, mounting the detector 31 and the collimated light source 29 on the same substrate allows these two components to be mounted closer to one another for compactness. The substrate may comprise at least one of a micro-chip, a printed circuit board (PCB), and a leadframe.

In operation, the pointing device 25 may be remote from the encoded surface 23 during pointing. In one example, the device 25 is at least 15 centimeters (6 inches) from the encoded surface 23. In another example, the device 25 is at least 90 centimeters (3 feet) from the encoded surface 23. The device 25 will operate at relatively large distances, as long as the collimated light beam C can reach the encoded surface 23 and sufficient scattered light can reach the detector 31. Such a device 25 is particularly useful for off-desk navigation, large displays, presentations, collaborations, and home-based screens that may extend beyond 3 meters (10 feet) across.

In one example, the position determined on the encoded surface 23 is a relative position. The controller 33 responds to the detected portion of the scattered light to determine any relative movement of the position where the collimated light beam C strikes the encoded surface 23, which corresponds to any relative movement of where the device 25 is pointing. When the collimated light beam C projects onto the encoded surface 23, the scattering features 37 will scatter the light at the particular wavelength corresponding to the wavelength of the light source 29. The spatial and/or time variations of the detected scattered light may then be utilized to deduce the position and displacement of the pointing device 25 operated by the user, which in turn may be utilized to drive software of a connected computer.

In a particular example of an encoded surface 23 utilized for determining relative position, a repetitive pattern may be utilized, as long as the pattern is different in the x-direction than it is in the y-direction. Such a differentiation between the x-direction and y-direction encoding may be readily achieved by various means, such as geometrical differences (e.g., the width, or spacing, of the pattern), as well as physical properties (e.g., surface roughness and reflectivity). Additionally, any crossing points of the x-direction and y-direction features will provide a third type of unique scattering, such as implied either in time duration or in the signal amplitude of the corresponding detected pulse.

Figure 2:
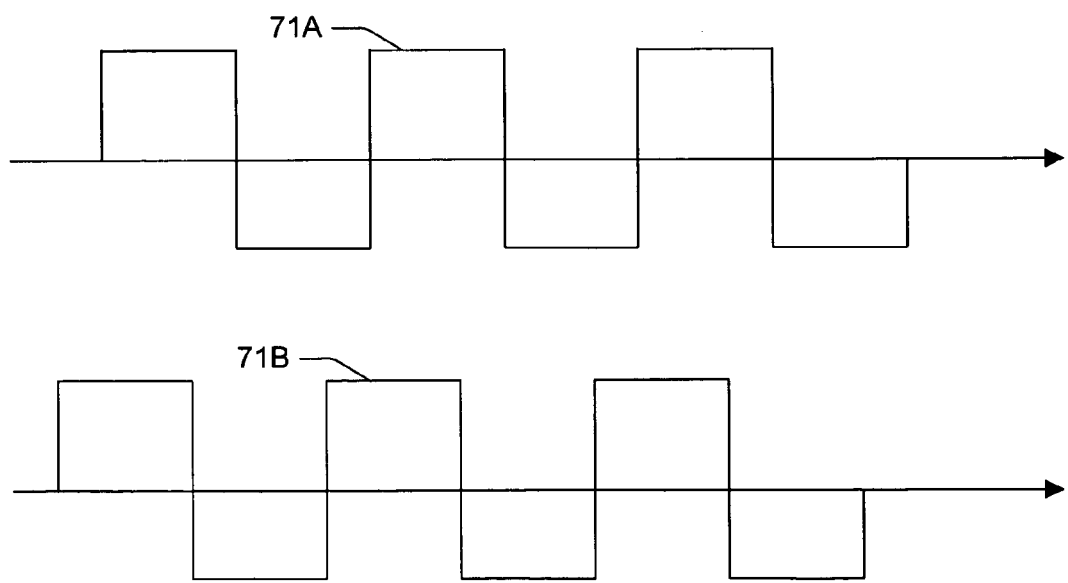
FIG. 2 depicts two phase-separated waveforms detected as a collimated light beam moves with respect to the encoded surface.

Utilizing the encoded surface 23 described above, when the collimated light beams C move across the encoded surface, the detectors 31 will send a time-series of signals to the controller that may be digitized as square pulses 71A, 71B (e.g., FIGS. 2 and 4). Such pulses may be counted (similar to a ball mouse) to determine the number of scattering features 37 encountered during beam C movement, and subsequently the length of movement in the x and y directions.

In the example depicted, the spot size D of the collimated light beam C is comparable in size to the scattering features 37 of the encoded surface 23. For this example, only time-series information from a 2×2 photodetector needs to be analyzed, much like the conventional ball mouse. But spatial resolution of this approach may be limited by spot size D. Thus, for a diverging collimated light beam C and a large distance E between the encoded surface 23 and the device 25, the resolution of location detection may be limited as the spot size D increases. In another example, to improve resolution, diffraction techniques may be utilized, wherein a phase grating pattern (not shown) may be used to generate a fringe pattern, and the 2×2 photodetector senses and counts the fringes to deduce the motion of the collimated light beam C with respect to the encoded surface 23.

In one example providing relative position of the pointing device 25, the device 25 comprises a second collimated light source 29B and a second detector 31B associated with the second collimated light source. The second collimated light source 29B projects a second collimated light beam C onto the encoded surface 23, and the encoded surface scatters the second collimated light beam striking the encoded surface. This second detector 31B detects at least a portion of the light scattered from the second collimated light beam C. Generally speaking, one skilled in the art may modify the number of collimated light sources 29, the optics associated with the light sources, and the arrangement of the light sources, optics, and detectors 31 to produce a variety of devices 25. For example, the arrangement depicted in FIGS. 1 and 3 will yield the detector output depicted in FIGS. 2 and 4. In particular, the scattering features 37 on the encoded surface 23 provide two signatures when the collimated beams C move in one direction relative to the encoded surface. In this particular example, such signatures are phase separated by 1.6 radians (90 degrees).

In any event, the example of FIGS. 1 and 3 incorporates four detectors 31 and four collimated light sources 29. For simplification, only two of such detectors 31A,31B and light sources 29A,29B are depicted in FIGS. 1 and 3. For example, this pair of collimated light sources and detectors may provide y-direction information, while another pair oriented at 90 degrees may provide x-direction information. In the configuration shown, two collimated light beams C project onto the encoded surface 23. The collimated light beams C create spot sizes D, which are comparable in size to the scattering features 37 included on the encoded surface 23. Moreover, the two collimated light sources 29 are spaced apart from one another at a distance of about 5.5 times the size of the scattering features 37. In this case, depending upon the direction of movement of the collimated light beams with respect to the encoded surface, indicated by arrows M, waveforms 71A and 71B (FIGS. 2 and 4) will be phase-separated by about + or −1.6 radians (+ or −90 degrees), depending upon the direction of movement. For example, where the device 25 of FIG. 1 is depicted moving downward with respect to the encoded surface 23, waveform 71A will be phase-separated about 1.6 radians (90 degrees) ahead of waveform 71B, as depicted in FIG. 2. The phase shift is brought about because the detector 31A senses scattered light from the first scattering feature 37 before the second collimated light beam C has reached its corresponding scattering feature. Conversely, where the device 25 of FIG. 3 is depicted moving upward with respect to the encoded surface 23, waveform 71B will be phase shifted about 1.6 radians (90 degrees) ahead of waveform 71A.

In another example, the determined position on the encoded surface 23 is an absolute position. For absolute position determination, the encoded pattern 23 may include scattering features arranged in spatially varying patterns (e.g., barcode-like) for detecting absolute positions. In absolute positioning processing examples, the controller 33 will require additional information around the pixels of interest. For example, the encoded surface 23 may be encoded with varying gray-scale or varying reflectivity, among other possibilities, to achieve spatial position-coding.

In another example, a method determines a position where a collimated light beam of a pointing device strikes an encoded surface remote from the pointing device. The location corresponds to where the device is pointing. The method comprises projecting the collimated light beam from the pointing device onto the encoded surface generally as set forth above. The encoded surface has light-scattering properties for scattering the collimated light beam. The method further comprises detecting at least a portion of the light scattered by the encoded surface. Finally, the method comprises determining the position where the collimated light beam strikes the encoded surface, which corresponds to where the device is pointing, as a function of a characteristic of the detected scattered light. The method may further comprise utilizing the position information to display an image on a display associated with the encoded surface. The image corresponds to the position where the collimated light beam strikes the encoded surface. Moreover, the method may further comprise utilizing the position information to execute a command on a computer associated with the pointing device. The command corresponds to an item on a display associated with the encoded surface, whereby the item corresponds to the position where the collimated light beam strikes the encoded surface.

Figure 5:
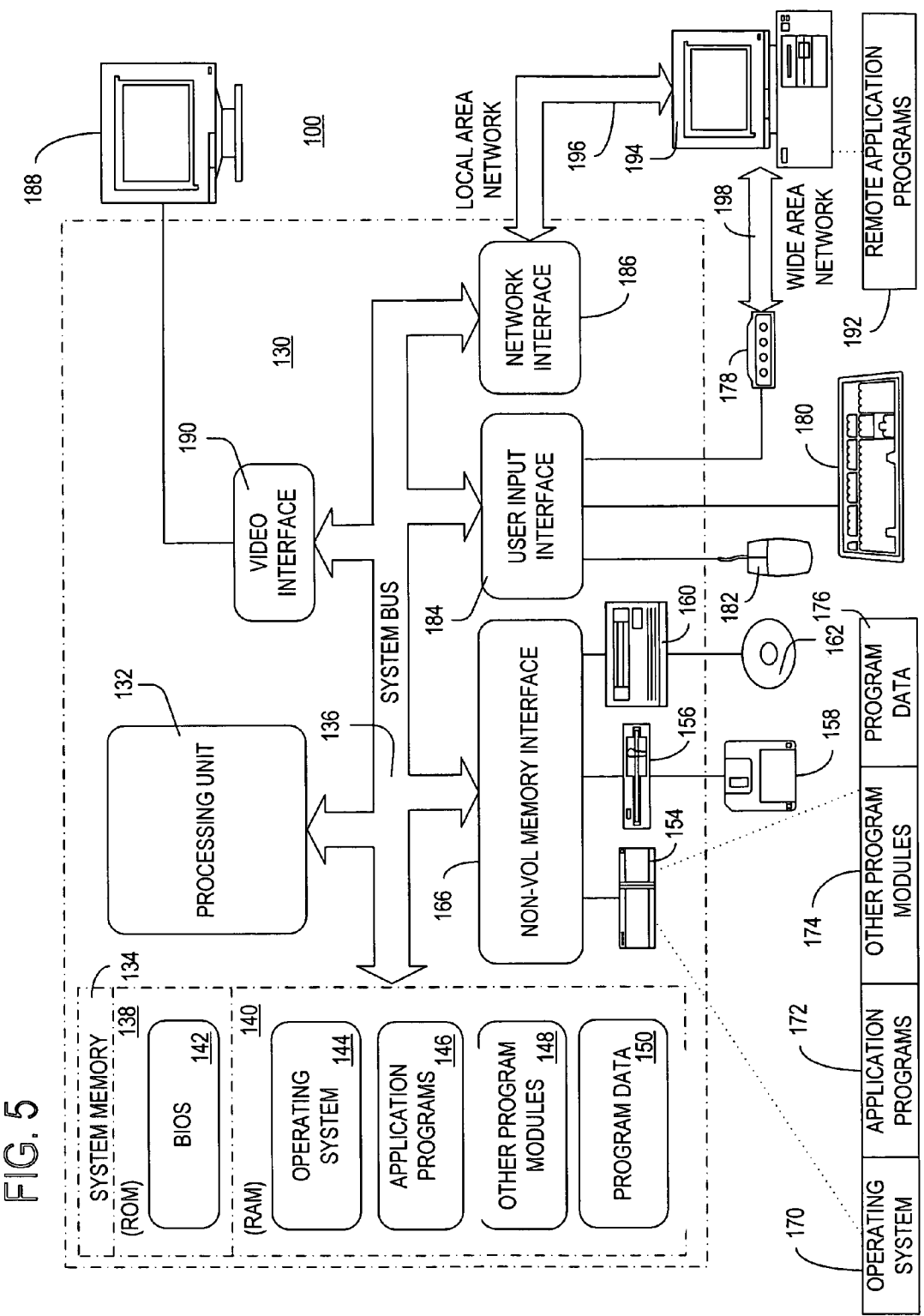
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid-state RAM, solid-state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, finger tracker, or the like. These and other input devices are connected to processing unit 132 through a user input interface 184 that is coupled to system bus 136, but may be connected by other interface and bus structures, such as a parallel port, game port, PS/2 port or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or substantially all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, personal digital assistants (PDAs), network PCs, minicomputers, mainframe computers, distributed computing environments that include any of the above systems or devices, and the like. The present invention is also applicable for non-computer applications, such as television remote cursor control, among others.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

Appendix A

There are three major techniques employed today for optical thin-film coating to achieve the desired transmission/reflection/absorption characteristics: thermal vaporization, ion-assisted thermal vaporization, and sputtering. Of the three techniques, the ion-assisted thermal vaporization technique has the following benefits:

1) may be used for both metallic and non-metallic thin film deposition;
2) may be used for multiple layer deposition;
3) may suit varied processing conditions (e.g., high and low temperature processing);
4) equipment includes many controllable parameters, including film thickness and various processing conditions; and
5) enables better qualities of the deposited film.

The deposition may be carried out on crystal, glass, flexible or rigid plastic substrate, or other surfaces that are of interest to serve as the two-dimensional surface. The likely thin film structure is multilayer film and non-metallic. The film should possess suitable mechanical, reliability, and optical properties, such as proper forward-scattering effects.

The typical process for discovering and developing the proper thin film coating is:

1) a software tool can be used for defining the type of materials to be used and relevant deposition structure based on the reflection/transmission/absorption requirements (including the number and thickness and order of layers deposited);
2) tuning based on designers' experiences and judgments;
3) a prototype may then be manufactured based on the above recipe; and
4) the prototype will be tested.

The software model only accounts for optical characteristics, thus, one needs to examine mechanical and other properties such as hardness, adhesion, etc. in addition to optical characterization.

The patterning can be realized through one the following methods:

1) Mechanical scribing,
2) Lithographic technique,
3) Chemical etching, and
4) Inkjet printing technique (may be most cost effective).

Patterns may be generated on demand, on almost any sized transparency, and by the customer. One needs to identify appropriate materials that may be made into liquid ink that can be fired by the inkjet printer with proper vaporization temperature.

With ink jet printing, a variation of the above includes mixing the correct elements in the ink so the ink can emit, e.g., fluorescence that may be detected by the camera with the correct optical filtering. This way, patterns may be detected even when encoded patterns are shadowed by the regular printings of texts and graphics.

What is claimed is:

1. A pointing system comprising:
an encoded surface; and a pointing device for use with the encoded surface wherein said device is remote from said encoded surface during pointing, said pointing device comprising:
a collimated light source for projecting a collimated light beam having a wavelength outside the visible light spectrum onto said encoded surface, said encoded surface scattering the collimated light beam striking said encoded surface;
a detector associated with the collimated light source for detecting at least a portion of said scattered light; and
a controller associated with the detector and configured to respond to the detected portion of the scattered light to determine a position where the collimated light beam strikes the encoded surface, said position corresponding to where the device is pointing.

2. A pointing system as set forth in claim 1 wherein the collimated light beam comprises infrared light.

3. A pointing system as set forth in claim 2 wherein said collimated light source is one of a resonant cavity light-emitting diode (RC-LED), a Vertical Cavity Surface-Emitting Laser (VCSEL), and an Edge Emitting Laser-Diode (EELD).

4. A pointing system as set forth in claim 2 wherein said encoded surface scatters only infrared light.

5. A pointing system as set forth in claim 2 wherein said encoded surface comprises at least one scattering feature that substantially scatters infrared light and at least one non-scattering feature that does not substantially scatter infrared light.

6. A pointing system as set forth in claim 5 wherein said at least one scattering feature and said at least one non-scattering feature cooperate to create a pattern on said encoded surface.

7. A pointing system as set forth in claim 5 wherein said at least one scattering feature is an infrared coating.

8. A pointing system as set forth in claim 1 wherein said encoded surface is visible-light transparent.

9. A pointing system as set forth in claim 8 wherein said encoded surface is mountable on another surface.

10. A pointing system as set forth in claim 1 wherein said device is at least 15 centimeters (6 inches) from said encoded surface.

11. A pointing system as set forth in claim 10 wherein said device is at least 90 centimeters (3 feet) from said encoded surface.

12. A pointing system as set forth in claim 1 wherein said position on said encoded surface is a relative position, wherein said controller responds to the detected portion of the scattered light to determine any relative movement of the position where the collimated light beam strikes the encoded surface, which corresponds to any relative movement of where the device is pointing.

13. A pointing system as set forth in claim 1 wherein said position on said encoded surface is an absolute position corresponding to a location on said encoded surface.

14. A pointing system as set forth in claim 1 wherein said device further comprises a filter for substantially filtering out light of a wavelength irrelevant to said detected portion of scattered light, thereby prohibiting said filtered out light from striking said detector.

15. A pointing system as set forth in claim 1 wherein said encoded surface is encoded with a digital pattern and wherein said controller is configured to determine position as a function of the digital pattern.

16. A pointing system as set forth in claim 1 wherein said encoded surface is incorporated into a display.

17. A pointing system as set forth in claim 16 wherein said controller signals the display to display an image corresponding to the position where the collimated light beam strikes the encoded surface.

18. A pointing system as set forth in claim 17 wherein said device further comprises a position adjustment mechanism for manually adjusting the location of the image on the display.

19. A pointing system as set forth in claim 18 wherein said position adjustment mechanism is one of a trackball and a touchpad.

20. A pointing system as set forth in claim 1 wherein said encoded surface includes an area of at least 0.13 square meters (200 square inches).

21. A pointing system as set forth in claim 1 wherein said detector is a photodetector.

22. A pointing system as set forth in claim 21 wherein said photodetector comprises at least four elements for detecting at least a portion of said scattered light.

23. A pointing system as set forth in claim 1 wherein said device further comprises a visible light source for projecting a visible light beam onto said encoded surface in substantially the same position on the encoded surface where the collimated light beam strikes the encoded surface.

24. A pointing system as set forth in claim 1 further comprising
a second collimated light source for projecting a second collimated light beam onto said encoded surface, said encoded surface scattering the second collimated light beam striking said encoded surface; and
a second detector associated with the second collimated light source for detecting at least a portion of said scattered light.

25. A pointing device for use with an encoded surface, wherein said device is remote from said encoded surface during pointing, said pointing device comprising:
a collimated light source for projecting a collimated light beam having a wavelength outside the visible light spectrum onto said encoded surface, said encoded surface scattering the collimated light beam striking said encoded surface;
a detector associated with the collimated light source for detecting at least a portion of said scattered light;
a housing, said collimated light source and said detector mounted on said housing; and
a controller associated with the detector and configured to respond to the detected portion of the scattered light to determine a position where the collimated light beam strikes the encoded surface, said location corresponding to where the device is pointing.

26. A pointing device as set forth in claim 25 wherein the collimated light beam comprises infrared light.

27. A pointing device as set forth in claim 26 wherein said collimated light source is one of a resonant cavity light-emitting diode (RC-LED), a Vertical Cavity Surface-Emitting Laser (VCSEL), and an Edge Emitting Laser-Diode (EELD).

28. A pointing device as set forth in claim 25 wherein said device further comprises a filter for substantially filtering out light of a wavelength irrelevant to said detected portion of scattered light, thereby prohibiting said filtered out light from striking said detector.

29. A pointing device as set forth in claim 25 wherein said encoded surface is encoded with a digital pattern and wherein said controller is configured to determine position as a function of the digital pattern.

30. A pointing device as set forth in claim 25 wherein said encoded surface is incorporated into a display,
   wherein said controller signals the display to display an image corresponding to the position where the collimated light beam strikes the encoded surface.

31. A pointing device as set forth in claim 30 wherein said device further comprises a position adjustment mechanism for manually adjusting the location of the image on the display.

32. A pointing device as set forth in claim 31 wherein said position adjustment mechanism is one of a trackball and a touchpad.

33. A pointing device as set forth in claim 25 wherein said device further comprises a visible light source for projecting a visible light beam onto said encoded surface in substantially the same position on the encoded surface where the collimated light beam strikes the encoded surface.

34. A pointing device as set forth in claim 25 further comprising
   a second collimated light source for projecting a second collimated light beam onto said encoded surface, said encoded surface scattering the second collimated light beam striking said encoded surface; and
   a second detector associated with the second collimated light source for detecting at least a portion of said scattered light.

35. A pointing device as set forth in claim 25 wherein said position on said encoded surface is a relative position,
   wherein said controller responds to the detected portion of the scattered light to determine any relative movement of the position where the collimated light beam strikes the encoded surface, which corresponds to any relative movement of where the device is pointing.

36. A pointing device as set forth in claim 25 wherein said position on said encoded surface is an absolute position corresponding to a location on said encoded surface.

37. A pointing device as set forth in claim 25 wherein said detector is a photodetector.

* * * * *